April 29, 1952  D. W. SMITH  2,595,013
PIE PLATE DEPOSITOR

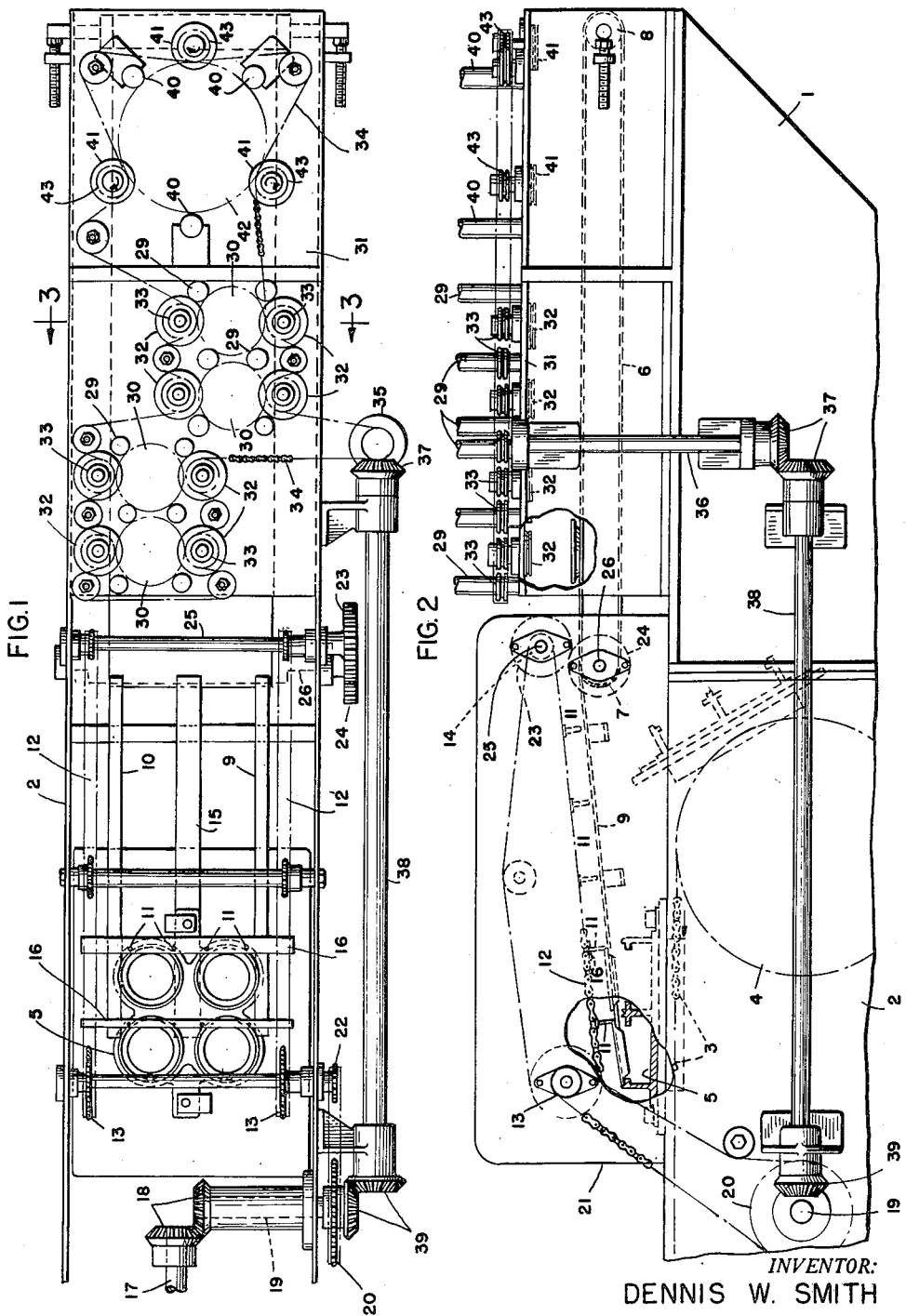

Filed May 25, 1949  3 Sheets-Sheet 2

INVENTOR:
DENNIS W. SMITH
BY
ATT'YS

April 29, 1952   D. W. SMITH   2,595,013
PIE PLATE DEPOSITOR
Filed May 25, 1949   3 Sheets-Sheet 3
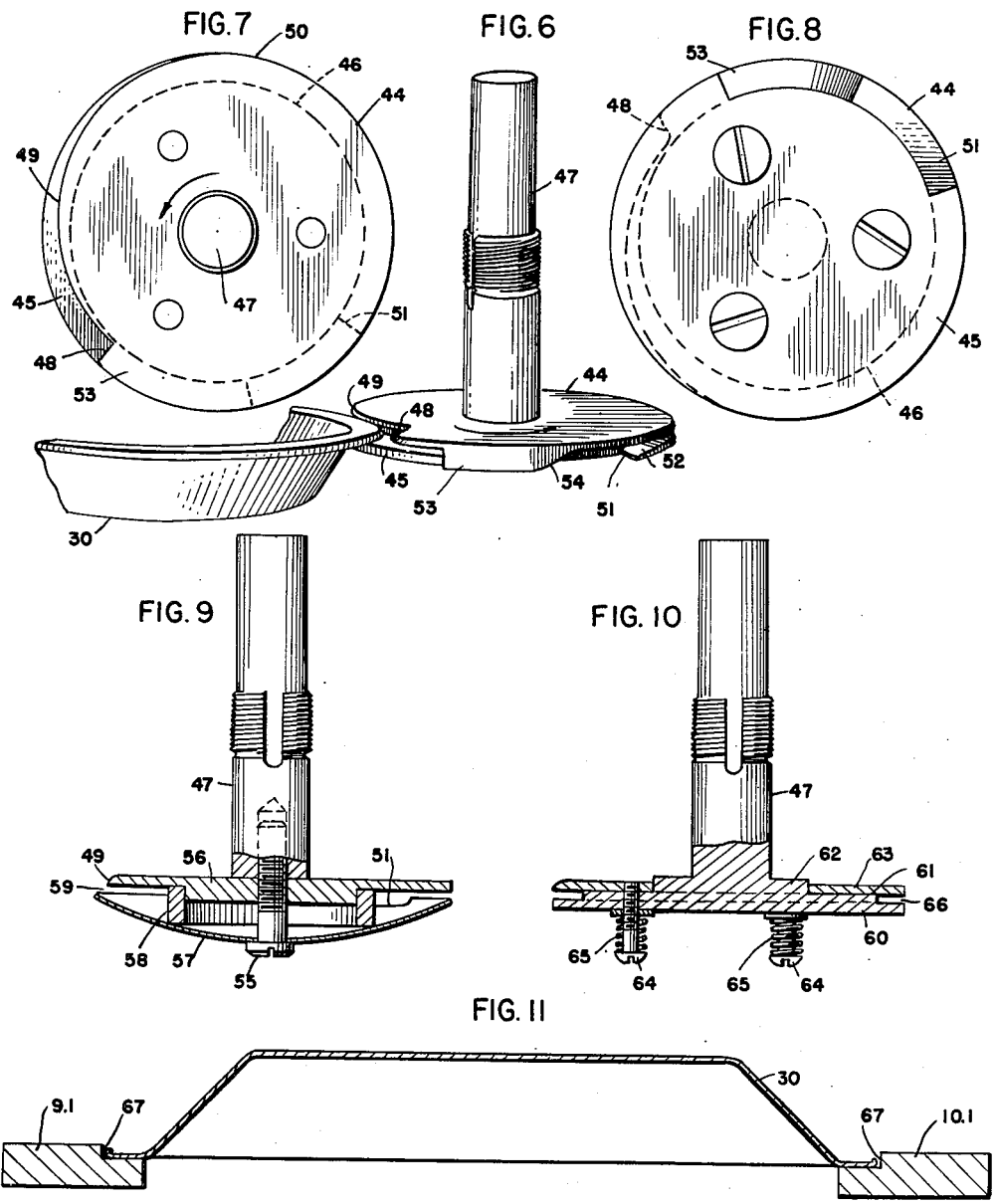
INVENTOR:
DENNIS W. SMITH
BY
ATT'YS Patented Apr. 29, 1952

2,595,013

UNITED STATES PATENT OFFICE 2,595,013

PIE PLATE DEPOSITOR

Dennis W. Smith, Chicago, Ill., assignor to Colborne Manufacturing Company, Chicago, Ill., a corporation of Illinois Application May 25, 1949, Serial No. 95,347

7 Claims. (Cl. 198—102)

This invention relates to continuous pie making machines and particularly to devices for such machines which automatically supply and deposit empty pie plates onto the traveling plate holders which carry the plates through the several operations of the machine incident to the continuous production of pies.

The main objects of this invention are to provide an improved device, for association with a continuous pie making machine, to automatically supply empty pie plates to the plate holders or plate carriers of the machine; to provide such a device that will be accurate and continuous in its operation; to provide such a device that will automatically remove a pie plate from a stacked supply of plates and deposit the plate evenly on a continuously moving carrier; and to prodive such a device that can be readily attached to the loading end of existing pie machines, of the traveling plate holder type, and easily synchronized therewith.

Other principal objects of this invention are to provide an improved stripper or release device for removing pie plates, one at a time, from the bottom of a stack of such plates; to provide such a device that will handle pie plates having uneven rims and rims of varying thickness; to provide such a device that can be accurately timed to strip plates from a plate stack at a constant predetermined rate; to provide an improved plate depositing mechanism that may be adapted to handle pie plates of any size; to provide an improved pie plate depositing mechanism that will release pie plates, from the bottom of a stack of nested plates, and drop them evenly onto a moving conveyor means; and to provide such a mechanism comprising a plurality of strippers that will coact to support a stack of plates and release said plates individually, without tipping or tilting, so that the plates will drop flatly onto a moving conveyor or belt.

A specific embodiment of this invention is shown in the accompanying drawings in which:

Figure 1 is a top plan view of an improved pie plate depositor, showing the device attached to the loading end of a pie making machine.

Fig. 2 is a side view of the same showing the plate depositing mechanism in elevation.

Fig. 6 is a side view, in perspective, of one form of plate stripper or releasing device, showing the manner in which a pie plate is engaged by the same during the releasing operation.

Fig. 7 is a top plan view of the same.

Fig. 8 is a bottom plan view of the same.

Fig. 9 is a partly sectioned view, in elevation, showing a modified form of the plate stripper.

Fig. 10 is a similar view showing another form of the plate stripper and the manner in which the stacked plates are supported and stripped individually for release, and Fig. 11 is a sectional view showing an arrangement of the plate delivery guides for handling inverted plates to make pie crust shells.

Figure 3:
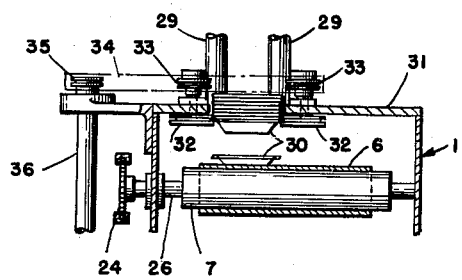
Fig. 3 is a sectional view, in elevation, as taken on line 3—3 of Fig. 1, to show one arrangement of the plate stripping or releasing means.

In the form shown in the drawings, the improved pie plate depositing mechanism is mounted on a suitable frame, indicated generally by the numeral 1, adapted to be attached to a pie making machine 2 at its loading end. The pie making machine 2 is of the usual construction including an endless conveyor comprising a pair of chains 3 traveling over sprockets 4 and adapted to carry a series of pie plate holders 5 in the usual manner. The pie making machine forms no part of the present invention, and therefore only a portion of the loading end is illustrated to show the coaction with the pie plate depositing mechanism.

As shown, the pie plate depositor comprises a horizontally disposed endless belt 6, traveling between horizontally spaced rollers 7 and 8, and a plurality of plate depositors adapted to drop pie plates in a predetermined sequence upon the conveyor belt 6.

The pie plates dropped upon the belt 6 are transported thereby toward the loading end of the pie making machine 2 where the pie plates are delivered onto an inclined trackway comprising spaced guide members 9 and 10, adapted to engage each pie plate by its peripheral flange, so that the pie plate can be pushed along the guide members and delivered in properly timed relation into the moving plate holders of the pie machine 2.

As shown, the conveyor belt 6 is disposed at a higher elevation than the plane of the plate holders 5, as they are propelled along the top of the pie making machine by the chains 3, and the inclined guideway extends downwardly and forwardly from the delivery end of the belt 6 to the level of the plate holder 5 when it is in horizontal position ready to receive the pie plate.

As indicated in Fig. 2, the pie plates are pushed along the inclined guideway, on the guide members 9 and 10, by means of suitably disposed fingers 11 which are carried by a pair of endless chains 12, which in turn travel over horizontally journaled sprockets 13 and 14 disposed above the pie plate trackway. The fingers 11 project outwardly from suitable crossbars extending between the chains 12, so that those fingers on the lower pass of the chains 12 will project downwardly therefrom to engage the rim of a pie plate and push it along the trackway to the delivery end thereof where the pie plate is then dropped into the pie plate holder 5, which has meanwhile moved into plate receiving position.

The speed of travel of the conveyor belt 6 and the chains 12, which carry the pusher fingers 11, are accurately timed relative to the speed of the chains 3 which carry the pie plate holders 5 through the pie making machine 2. Also the spacing of the pusher fingers 11 along the chains 12 is arranged to move the pie plates in properly spaced relation to each other. Thus, pie plates deposited on the conveyor 6 are delivered continuously therefrom onto the inclined trackway where they are immediately engaged individually by the pusher fingers 11 and finally discharged from the delivery end of the trackway in such timed relation with the movement of the plate holders that each pie plate will be accurately deposited into a respective plate holder at the instant that the holder is in proper position to receive the pie plate.

The plate holder or carrier 5 shown in Figs. 1 and 2 is of the form used for the small "individual" size, 4 inch pie plates and this carrier is arranged to receive four plates at each loading, disposed square to the line of travel. Likewise the trackway is arranged to deliver these plates in two parallel rows and therefore includes a middle guide bar 15 disposed between the bars 9 and 10 so that the small plates will be adequately supported. The pusher fingers 11 are also mounted on crossbars 16 in pairs, two fingers being provided for each plate. Also, the fingers of each pair are spaced to engage a pie plate equidistantly on each side of its center so as to push the plate squarely along the guide bars and then deliver it to the plate holder in exact alignment with the plate receiving pockets in the holder. Thus, in the arrangement of Figs. 1 and 2, the plates are delivered to the plate holder in pairs and the pairs of plates are spaced, in the direction of travel, so that each pair will be discharged from the end of the trackway at the exact instant that the respective pair of plate holder pockets is in proper position to receive them.

Since the plate holders are spaced apart a greater distance than the two pairs of plates deposited in each carrier, the pusher fingers 11 for each group of plates must be accordingly spaced, as will be understood, so that the plates will be delivered from the trackway in timed relation with the arrival of the successive plate holders at the loading position. Also the plates are delivered to the trackway, by the belt 6, at such a rate that they will be engaged by the respective fingers 11 in proper sequence.

This timing of delivery of the plates to the respective plate holders is accomplished by driving the belt 6 and the pusher finger chain 12 from the same source of power that drives the plate holder chain 3; and as shown in Figs. 1 and 2 the power is taken from the main drive shaft 17, of the pie machine 2, through bevel gears 18, to a cross shaft 19 which carries a drive sprocket 20 disposed on the outside of the frame of the pie machine 2. A chain 21 connects the sprocket 20 with the pusher chain drive sprocket 22, for a direct drive of that element, and the forward roller 7 of the conveyor belt 6 is driven from the pusher chain by means of the gears 23 and 24 which are respectively mounted on the adjacent ends of the cross shafts 25 and 26.

As shown in Fig. 2 the sprockets 14, which carry the pusher chain 12 at its rearward end, are considerably smaller than the pusher chain drive sprockets 13. The purpose of this arrangement is to cause the pusher fingers to make the rearward turn at as fast a rate as possible so that they may enter between the closely following pairs of pie plates without danger of the finger tips engaging the upper flange surfaces of the rearward plates. This permits the plates to follow each other closely with the same spacing as the openings in the plate holder 5 into which they are to drop. This also permits the horizontal run or pass of the pusher chain 12 to travel at the same speed as the plate holders and the delivery belt or conveyor 6.

It will now be seen that pie plates deposited on the conveyor belt 6 are automatically delivered thereby onto the inclined trackways, formed by the guide bars 9, 10 and 15, and are immediately picked up by the pusher fingers 11, which propel the plates along the trackway and off the discharge end thereof into the appropriate pockets of a respective plate holder 5. The plates are supplied continuously by the conveyor 6 and the spacing of the pushers 11, along the rim of the pusher chain 12, is such that the plates are discharged from the end of the trackway in exactly timed relation with the arrival, and forward motion of, the plate holders, which move beneath the trackway.

Figure 4:
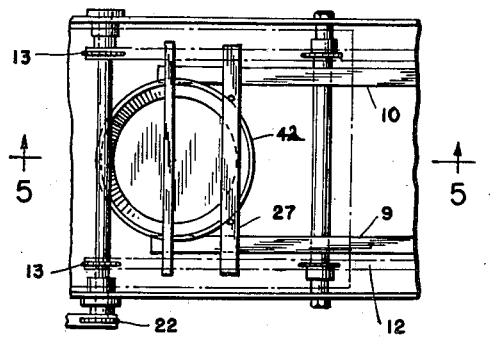
Fig. 4 is a fragmentary plan view of the delivery end of a plate depositor, showing the arrangement for supplying large size pie plates to a single-plate plate holder.
Figure 5:
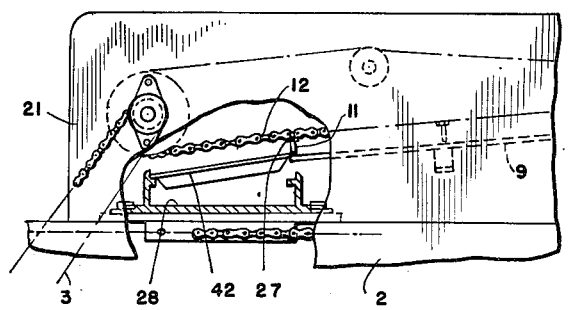
Fig. 5 is a fragmentary elevational view of the same as taken on line 5—5 of Fig. 4.

As shown the pie plate delivery mechanism is so constructed that it may be readily changed over to handle pie plates of other sizes than the small 4 inch plates shown in Figs. 1 and 2. This change over is accomplished by removing the center guide bar 15 and moving the bars 9 and 10 laterally to fit beneath the flanges of the larger size plate, as shown in Fig. 4; and by changing the pusher finger crossbars 16 for new finger bars having a wider finger spacing. Also the spacing of the new finger bars, shown at 27 in Fig. 4, along the pusher chains 12 is greater, as will be understood, since the large size plate holder 28 will accommodate only one pie plate at a time, as shown in Fig. 5.

It will be understood, of course, that the plate holders 5 and 28 are removably mounted on the carrier chain 3, and are interchangeable, as is customary with the usual continuous pie making machines.

Referring to Figs. 1 and 2 it will be seen that the pie plate depositing mechanism shown is made in two sections. One for the small individual size of pie plate, and the other for the usual 8 inch or 9 inch plate. The depositor for the smaller plates is arranged to drop four plates for each plate holder on the pie making machine and comprises a series of vertical columns 29 arranged to confine four separate vertical stacks of nested plates 30. The columns 29 extend upwardly from a bed plate 31 which is provided with suitable apertures, below the plate stacks, through which the plates are dropped onto the conveyor belt 6; and each stack of plates is supported on a pair of oppositely disposed plate releasing discs 32.

The pie plate releasing discs 32, which will be later described in detail, are preferably located below the bed plate 31 and each is mounted on a vertical shaft which is journaled in the bed plate and which carries a sprocket 33 on its upper end above the bed plate. The releasing discs operate by rotation, to separate the bottommost pie plate from the respective stack and then drop the plate onto the conveyor 6; and each pair of the discs 32 is arranged to operate simultaneously so that the pie plate will be instantly released at both sides in order that it can drop vertically, without any tilting or tipping, to land flatly on the conveyor 6 in proper alignment with the respective guide bars of the inclined trackway.

As shown, the four stacks of pie plates are arranged in two rows and it will be understood that the sequence or order in which the plates are released from the several stacks will be such that the plates will be delivered by the conveyor in transversely arranged pairs to accommodate the arrangement of the openings in the plate holder 5. This requires that the operation of the releasing discs be exactly timed with each other and with the movement of the belt 6, and such timing is accomplished by driving the rotating discs from the same source of power used to drive the belt 6 and the pusher chain 12.

Preferably all of the releasing discs 32 are driven through their respective sprockets 33, by a common means, such as the roller chain 34 which is arranged to pass over each sprocket 33 in such a manner that all sprockets will turn in the same direction, suitable idlers being interposed between the several sprockets to assure a tight engagement of the chain with each sprocket. The chain 34 is driven from a drive sprocket 35 mounted on a vertical shaft 36, suitably journaled in brackets secured to the depositor frame, and the shaft 36 is driven through bevel gears 37 by a horizontal shaft 38 which takes its power through bevel gears 39 from the shaft 19 which drives the pusher chain 12, as shown in Fig. 1.

The depositor mechanism for the large pie plates, shown at the right hand end of the machine in Figs. 1 and 2, is similar in most respects to the means for handling the small plates. As shown, however, the stack of plates is held between three vertical columns 40, extending upwardly from the bed plate 31 and spaced 120 degrees angularly from each other. Also three rotating releasing discs 41 are employed, in order that the stack of plates will be evenly supported and so that each plate 42 will be released in a perfectly horizontal position and land flatly on the conveyor 6.

The releasing discs 41 are driven through respective sprockets 43 in the same manner as the discs 32 and by means of the same roller chain 34. Thus the discs 41 are driven in direct timed relation with the other components of the machine and all of the releasing discs operate in unison for instantaneous, all around, release of each pie plate.

Details of the releasing disc construction are shown in Figs. 6 to 10 inclusive, and three forms of the device are illustrated. As shown in Figs. 6, 7 and 8, the releasing disc is a composite structure comprising a pair of flat annular plates or discs 44 and 45, of equal size, spaced apart by a spacer member 46, which is of lesser diameter than the outer discs and is of a thickness slightly greater than the thickness of the turned edge of a pie plate flange. Usually, the spacer member 46 is formed as an integral part of the bottom disc 45 and the bottom disc is secured to the upper disc 44 by means of suitable flathead screws or rivets which are countersunk into the disc surfaces so that there will be no unnecessary projections from either the top or bottom side.

As shown in Fig. 6, the disc assembly is mounted on the end of a shaft 47, which shaft is adapted to be journaled in a suitable bushing in the bed plate 31 of the depositing machine and to carry the driving sprocket on its upper end.

In the form shown in Fig. 6 the groove or channel between the upper and lower plates, provided by the spacer member 46, is of a depth just sufficient to engage and receive the outer margin of a pie plate flange; and as shown in Fig. 7, the periphery of the upper disc 44 is cut away as at 48 so that the flange of a pie plate may drop past the disc 44 and engage the margin of the lower disc 45. The notch thus formed in the upper disc 44 is cut radially into the disc, as at 48, and from the bottom of the notch the margin of the disc is formed to curve gradually outward along a spiral path as at 49, until, after passing through an angular distance of approximately 120 degrees, the margin of the disc 44 becomes circular as at 50.

Thus, with a stack of nested pie plates being supported on the upper disc 44, by engagement of the flange of the lowermost pie plate in the stack with the margin of the disc 44, the lowermost pie plate may drop through the notch 48, as the disc is rotated, so as to rest upon the bottom disc 45. Then because of the channel provided by the spacer member 46, the edge of the spirally curved periphery of the top disc 44 will be entered between the bottommost pie plate and the next succeeding pie plate as the disc continues to rotate, so that the stack of pie plates will again be supported wholly by the margin of the upper disc 44. As the releasing disc continues to rotate, the lowermost pie plate is finally released from the bottom disc member 45 through a notch 51 formed in the periphery thereof at a point substantially 240 degrees beyond the location of the notch 48. The notch 51 is formed by cutting away a segment of the margin of the disc 44 and the angular length of the cut away segment is made sufficiently great to assure the pie plate flange being completely released.

To facilitate complete and instantaneous release of the pie plate margin, the upper surface of the disc 45, where it approaches the notch 51, is ground down as at 52 to assure that there will be no binding between the upper and lower discs 44 and 45 at the release point. Also, as shown in Fig. 6, the upper disc 44 is provided with a camming lug 53 which projects downwardly through the margin of the disc 45, to at least the lower surface thereof, and the end of the lug 53 nearest the release point is provided with a downwardly curved cam surface 54 which is intended to serve as a means to direct the pie plate downwardly at the instant it is released at the notch 51.

As will be understood, the several releasing discs for each pie plate stack rotate continuously at exactly the same speed and the bottommost pie plate, in the stack of plates supported by the releasing discs, will drop through the notch 48 in each upper disc member and onto the margin of the lower disc member, instantly and simultaneously, when the respective notches 48 become radially aligned with the axis of the plate stack. Then as the releasing disc rotates, the edge 49, of each upper disc member 44, which is preferably tapered or thinned, will be entered between the lowermost pie plate and the next successive pie plate in the plate stack, whereby, as the discs continue to turn, the bottom plate becomes separated and the stack of plates becomes wholly supported by the upper disc members 44. The lowermost pie plate then rides on the margin of the bottom disc members 45 until the disc has turned to the point where the notches 51 become radially aligned with the axis of the plate stack, at which point the pie plate is released completely so as to drop straight down and land flatly on the conveyor belt passing beneath the plate stack. Then as the releasing devices continue to rotate, the next pie plate of the plate stack will be stripped or separated from the stack by dropping, through the notches 48, onto the margin of the lower disc members 45, where the releasing operation will again be repeated.

The frequency at which plates are released from the plate stack and dropped onto the conveyor traveling beneath the plate stack is determined entirely by the speed of rotation of the coacting releasing devices upon which the stack of plates is supported and such speed of rotation will, therefore, be coordinated with the speed of operation of the other components of the plate depositing and delivering mechanism.

It often happens that the edges of the pie plate flanges become bent, broken, or thickened in use, and in order to provide for that contingency, the releasing discs may be constructed with an axially yieldable upper or lower member to permit self-adjustment of the thickness of the groove or channel between the disc parts and thus prevent binding or jamming of the pie plate margins in the said channel. Two forms of the device embodying this self-adjusting feature are shown in Figs. 9 and 10 respectively.

Referring to Fig. 9, it will be seen that the releasing disc assembly, which is mounted on the end of the releasing disc shaft 47 by means of a central screw 55, comprises an upper disc member 56 which abuts the lower end of the shaft 47, and a flexible lower disc member 57 which is spaced from the upper disc 56 by means of a ring or collar 58. The flexible disc member 57 is of dished form with its concave side facing toward the upper disc member 56, and the width of the channel 59 between the two disc members is determined by the spacer ring 58 with some slight adjustment being permitted by the tensioning of the mounting screw 55. The peripheries of the releasing disc plate members 56 and 57 are formed and arranged in the same manner as heretofore described for the releasing disc shown in Figs. 6 to 8 inclusive.

With this form of the releasing disc any irregularities in the pie plate flange, which might require a greater than normal width of the channel 59, will cause the margin of the flexible lower disc member 57 to yield downwardly and thus permit passage of the irregular portion of the pie plate flange along the channel 59 without binding or jamming.

In the form of releasing disc shown in Fig. 10, the bottom plate 60 of the releasing disc assembly is attached rigidly to the lower end of the shaft 47 and the annular spacing member 61 is formed integrally on the upper face of the member 60. Also a central boss 62 is integrally formed on the upper side of the spacing member 61 at the bottom end of the shaft 47. This boss 62 is made with a peripheral form that is other than annular and the upper releasing disc member 63 is provided with a central opening shaped to slidably fit over this boss so that the upper disc member may rest flatly against the top surface of the spacer 61 and at the same time be keyed against relative rotation.

As shown, the upper disc member 63 is the yieldable part of the releasing disc assembly and is held under tension against the top surface of the spacer member 61 by a plurality of headed studs 64 which extend upwardly through suitable holes in the bottom disc member and the spacer and into the upper disc member 63 where they are secured. The headed ends of the studs 64 project downwardly below the disc member 60 and coiled springs 65 are disposed on the studs so as to bear between the stud heads and the bottom surface of the member 60.

Preferably the fit of the upper or yieldable disc member 63 on the boss 62 is loose enough to permit the upper disc member 63 to yield in a tilting manner, and the mounting and tensioning studs 64 are spaced apart angularly far enough to permit such tilting action. Thus, when an irregularity in the flange of a pie plate becomes engaged in the channel 66, between the upper and lower disc elements, the upper disc 63 will yield relative to the bottom disc 60 and permit the irregularity in the pie plate flange to pass through the channel 66 without binding or jamming the releasing disc operation.

It will be understood, of course, that the form and arrangement of the peripheries of the releasing disc members 60 and 63 shown in Fig. 10, will be the same as shown and described with respect to the releasing disc illustrated in Figs. 6 to 8 inclusive; particularly with respect to the shape and location of the notches in the disc elements.

In the operation of the improved pie plate depositor, the releasing discs are caused to rotate in the same direction, and the stack of pie plates which are to be deposited, one at a time, on the moving conveyor which travels beneath the pie plate stack, are supported entirely by the respective releasing disc assemblies, the support of each pie plate stack being had through engagement of the flange of the bottommost pie plate on the margins of the respective releasing devices. Also, the releasing devices are so adjusted relative to each other that the notches 48, in the upper releasing disc member of the several releasing devices, will become axially aligned with the axis of the pie plate stack at the same instant and thereby permit the lowermost pie plate to drop downwardly through the notches 48 onto the margins of the lower disc members. Then, as the releasing devices continue to rotate, the lowermost pie plate is released simultaneously by all of the releasing devices through their notches 51 so that the pie plate will drop in a horizontal position directly downward and land flatly on the conveyor 6. The releasing devices are rotated in the same direction so that any turning action that might be imparted to the lowermost pie plate, just before it is dropped onto the conveyor, will be uniform around the entire periphery of the pie plate. Thus the pie plate will not become in any way tilted at the instant of its release.

Because the pie plate is dropped vertically and lands flatly on the conveyor, directly below the pie plate stack, and because the stack is aligned centrally with the path of the pie plate along the inclined trackway, each pie plate will enter the trackway on its centerline so that it can be picked up by the respective pusher fingers for transference down the trackway to the plate holder of the pie making machine.

It is often desired to use the pie making machine to bake piecrust shells, which shells are usually formed over an inverted pie plate. In such case the pie plates which are to be supplied to the pie making machine are placed in the depositor mechanism stacks in inverted position and are dropped in this manner onto the conveyor belt 6. In order to keep the pie plates in alignment with the path of the plate holders of the pie making machine, it is necessary, however, to have a somewhat different form for the guide members of the inclined trackway and such an arrangement of the guide members is illustrated in Fig. 11. As shown, the guide members 9.1 and 10.1 are provided with inwardly facing channels 67 on their upper side which will receive the inverted pie plate flange and hold the pie plate against any lateral displacement that might cause it to be out of alignment with the plate holder on the pie making machine. Otherwise, the construction and operation of the pie plate depositing mechanism is exactly the same as heretofore described.

Details of the plate holders of the pie making machine, into which the pie plates are delivered, are not shown or described since these plate holders and the arrangments for mounting them on the conveyor mechanism of the pie plate machine are well known in the art. Also, it is customary and well known to provide interchangeable plate holders which can be quickly and easily removed from the pie making machine conveyor mechanism for changing the plate holders to suit the size of the pie plates that are to be used.

The main advantages of this invention reside in the fact that a relatively large supply of pie plates can be stacked in the plate depositing mechanism and fed automatically and accurately in predetermined timed relation onto a delivery mechanism which will deposit the plates automatically on the plate holders of a pie making machine without in any way effecting the timing or the operation of the pie making machine; and in the arrangement wherein the operation of the pie plate depositing mechanism is so related with the operation of the pie making machine, that no attention whatsoever is required on the part of the operator other than to see that the pie plate stacks in the depositor mechanism are filled.

Heretofore, because of the difficulty of mechanically supplying pie plates to moving pie plate holders, it has been necessary to place the pie plates in the plate holder manually. Thus, through the use of the improved depositing mechanism, the services of at least one operator are eliminated with a resultant saving in production costs. Also, with the improved pie plate depositing mechanism, it is possible to operate the pie making machine at a faster speed and continuously since the variable human factor of manual placement of the pie plates in the plate holders is eliminated.

Although but one specific embodiment of this invention is herein shown and described, it will be understood that details of the construction shown may be altered or omitted without departing from the spirit of this invention as defined by the following claims.

I claim:

1. In a pie machine having a series of spaced plate holders moving continuously along a predetermined path, each of said plate holders having a top opening to receive a pie plate, a device for depositing pie plates onto the plate holders of the pie machine comprising a conveyor for pie plates, plate transfer means having a delivery end extending over the path of the plate holders in alignment with the plate openings thereof and adapted to receive plates from said conveyor, and pusher means associated with said transfer means for delivering plates therefrom onto the plate holders in predetermined sequence and in timed relation with the movement of said plate holders, said pusher means moving said plates at the same speed as said plate holders, and the delivery end of said transfer means being so spaced above said plate holders that the pie plates leave the slideway and enter the plate holders in registry with the openings thereof and in a position substantially parallel therewith.

2. In a pie machine having a series of spaced plate holders moving continuously along a predetermined path, each of said plate holders having a top opening to receive a pie plate, a device for depositing pie plates onto the plate holders of the pie machine comprising a conveyor for pie plates, a slideway extending over the path of the plate holders and having a delivery end disposed in central alignment with the path of the axes of the plate holder openings, said delivery end being adjacent the plane of the top surfaces of said plate holders, and said slideway being adapted to receive pie plates from said conveyor, and means for moving said pie plates along said slideway and off the delivery end thereof in predetermined sequence and in timed relation with the movement of said plate holders, the delivery end of said slideway being so spaced above said plate holders that the pie plates leave the slideway and enter the plate holders in a position substantially parallel therewith.

3. In a pie machine having a continuous series of spaced plate holders moving along a predetermined path, each of said plate holders having a top opening to receive a pie plate, a device for depositing pie plates onto the moving plate holders of the pie machine comprising a pair of horizontally spaced parallel guide bars adapted to engage a pie plate beneath its rim and slidably support the same, said guide bars extending over the plate holders and terminating above the plane of the tops thereof in central alignment with the path of the plate holder openings, means for propelling pie plates along said guide bars and off the terminal ends thereof in predetermined sequence and in timed relation with the movement of said plate holders, the terminal ends of said guide bars being so spaced above the plate holders that the pie plates enter the plate holder openings in a position substantially parallel with the plane thereof, and means adapted to deliver pie plates onto said guide bars continuously.

4. In a pie machine having a continuous series of spaced plate holders moving along a predetermined path, each of said plate holders having a top opening to receive a pie plate, a device for depositing pie plates onto the moving plate holders of the pie machine comprising a pair of parallel tracks inclined downwardly and terminating above the plane of the plate holder tops, said tracks being adapted to support and guide a pie plate and being centrally aligned with the path of the moving plate holder openings, means moving along said tracks adapted to engage pie plates individually and in predetermined sequence and to propel said pie plates along said tracks and off the terminal end thereof onto said plate holders in timed relation with the movement of said plate holders, the elevation of the terminal end of said tracks above the plate holders being such that the plate holders enter the holder openings in a substantially horizontal position, and means adapted to deliver pie plates onto said tracks continuously at a predetermined rate.

5. A device for depositing pie plates onto a pie machine having a series of plate holders moving continuously along a horizontal path and each plate holder having a top opening to receive a pie plate, comprising a pair of horizontally spaced parallel guide bars adapted to engage a pie plate beneath its rim and slidably support the same, said guide bars extending over the plate holders and terminating above the plane of the tops thereof in central alignment with the path of the plate holder openings, continuously moving overhead means adapted to engage the rims of individual pie plates between said guide bars and propel said plates toward the terminal end of said guide bars in timed relation with the movement of said plate holders, said last named means being adapted to engage the pie plates in predetermined sequence according to the spacing of the pie holders along their path of travel and to discharge said plates from the terminal end of said guide bars at the same lineal speed as the movement of said plate holders, the elevation of the terminal end of said guide bars above the plate holders being such that the pie plates enter the plate holder openings in substantially horizontal position, and means to deliver pie plates onto said guide bars continuously at a predetermined rate.

6. In a device for automatically depositing pie plates onto a continuous pie machine having a horizontal continuously moving series of plate holders, said plate holders each having a top opening to receive and seat a pie plate, the combination with mechanism for automatically delivering individual pie plates in predetermined sequence from a stack of such plates, of a moving conveyor adapted to receive the plates from the delivery mechanism, a transfer means extending over the path of the plate holders and having a delivery end disposed above and aligned with the path of the plate holder openings, said transfer means being adapted and disposed to receive pie plates individually from said conveyor and release said plates gravitationally at its delivery end directly over the path of the plate holders and in the direction of movement thereof, means for controlling the movement of said pie plates along said transfer means, and means to operate said delivery mechanism and said plate movement controlling means in predetermined timed relation with each other and in synchronized relation with the movement of the plate holders as they pass the delivery end of said transfer means.

7. In an automatic pie making machine having a series of plate holders moving continuously along a predetermined path, said plate holders each having an opening to receive and seat a pie plate, the combination with mechanism for automatically delivering individual pie plates in predetermined sequence from a stack of such plates, of a moving conveyor adapted for receiving the plates from the delivery mechanism, a transfer means extending over the path of the plate holders and having a delivery end disposed above and aligned with the path of the plate holder openings, said transfer means being adapted and disposed to receive pie plates individually from said conveyor and release said plates gravitationally at its delivery end directly over the path of the plate holder openings and in the direction of movement thereof, means for moving said plate holders along said transfer means from end to end thereof, and means for operating the last named means in predetermined timed relation with the movement of the plate holders and at the same lineal speed as said plate holders.

DENNIS W. SMITH.

REFERENCES CITED

The following references are of record in the file of this patent:

UNITED STATES PATENTS

| Number | Name | Date |
|---|---|---|
| 123,391 | Giffhorn | Feb. 6, 1872 |
| 683,039 | Hagen | Sept. 24, 1901 |
| 801,523 | Hinchman | Oct. 10, 1905 |
| 1,321,072 | Mingle | Nov. 4, 1919 |
| 1,663,288 | Ulrich | Mar. 20, 1928 |
| 1,676,639 | Elliot | July 10, 1928 |
| 1,722,673 | Nevala | July 30, 1929 |
| 1,885,935 | McAllister | Nov. 1, 1932 |
| 1,898,664 | Howe | Feb. 21, 1933 |
| 2,000,761 | Kohler | May 7, 1935 |
| 2,209,340 | Landry | July 30, 1940 |
| 2,211,433 | Papendick | Aug. 13, 1940 |